United States Patent [19]

Yamamuro et al.

[11] Patent Number: 5,306,903
[45] Date of Patent: Apr. 26, 1994

[54] OBJECTIVE LENS POSITION DETECTING SYSTEM CAPABLE OF ADJUSTING AMOUNTS OF RADIATION

[75] Inventors: Mikio Yamamuro, Zushi; Akihiko Doi, Tokyo, both of Japan

[73] Assignee: Kabushiki Kaisha Toshiba, Kawasaki, Japan

[21] Appl. No.: 909,692

[22] Filed: Jul. 7, 1992

[30] Foreign Application Priority Data

Jul. 8, 1991 [JP] Japan .................................. 3-167104

[51] Int. Cl.[5] .............................................. G02B 7/02
[52] U.S. Cl. .................................. 250/201.5; 359/813; 250/205; 360/77.03
[58] Field of Search ................... 250/561, 205, 201.5, 250/201.4, 201.2, 206.1, 214 C; 369/44.15, 44.21, 44.22, 44.28; 359/813, 814, 823, 824, 811; 360/77.03

[56] References Cited

U.S. PATENT DOCUMENTS

| | | | |
|---|---|---|---|
| 3,597,750 | 8/1971 | Brunner et al. | 360/77.03 |
| 3,945,037 | 3/1976 | Johnson | 360/77.03 |
| 4,598,586 | 7/1986 | Danielson | 250/205 X |
| 4,620,094 | 10/1986 | Tani et al. | 250/205 X |
| 4,650,332 | 3/1987 | Muraoka et al. | 250/205 X |
| 5,078,471 | 1/1992 | Takishima | 359/813 |
| 5,103,345 | 4/1992 | Watanabe et al. | 359/813 |

*Primary Examiner*—David C. Nelms
*Assistant Examiner*—John R. Lee

*Attorney, Agent, or Firm*—Finnegan, Henderson, Farabow, Garrett & Dunner

[57] ABSTRACT

Disclosed is an objective lens position detecting system which comprises an optical head for holding an objective lens for focusing a light beam on a storage disk having tracks formed thereon, a first detector having a first light-emitting element and a first light-receiving element and provided in a vicinity of the objective lens, unconnected thereto, for detecting the position of the objective lens, a second detector having a second light-emitting element and a second light-receiving element and provided in a vicinity of the objective lens, unconnected thereto, and apart by a predetermined distance from the first detector, for detecting the position of the objective lens, a plate, connected to the objective lens, for reflecting light from the first light-emitting element to the first light-receiving element and reflecting light from the second light-emitting element to the second light-receiving element, whereby the first detector and the second detector detect the position of the objective lens from values of the reflected light, a circuit for outputting a difference between detection signals received from the first detector and the second detector, and a circuit for receiving the detection signals from the first and second detectors and adjusting the amounts of radiation from the first light-emitting element and the second light-emitting element so as to cause the sum of the detection signals to approach a predetermined target value.

7 Claims, 6 Drawing Sheets

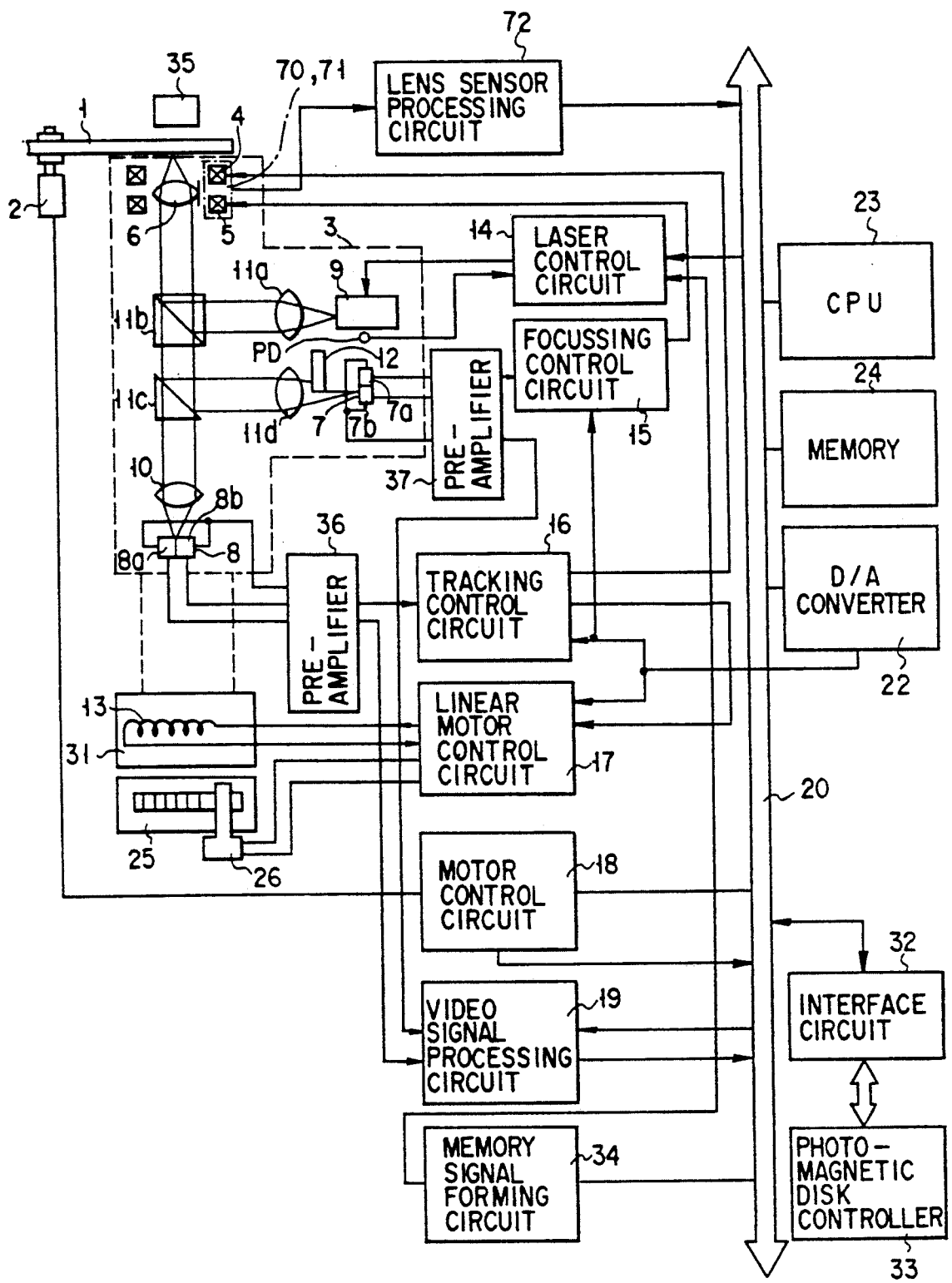
F I G. 2

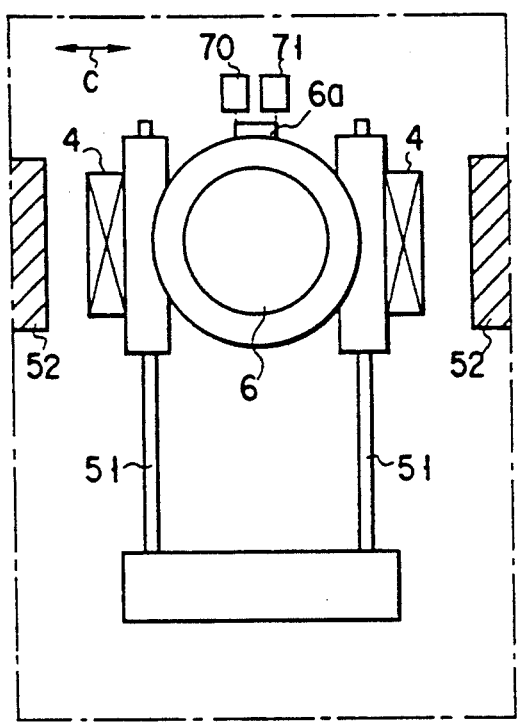
F I G. 3

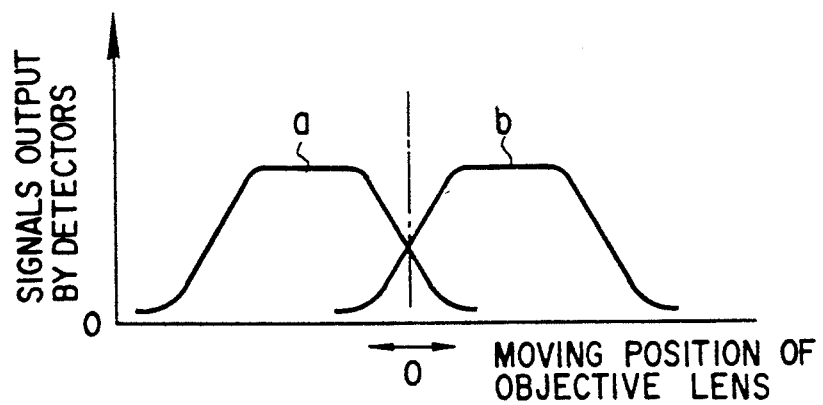
F I G. 4
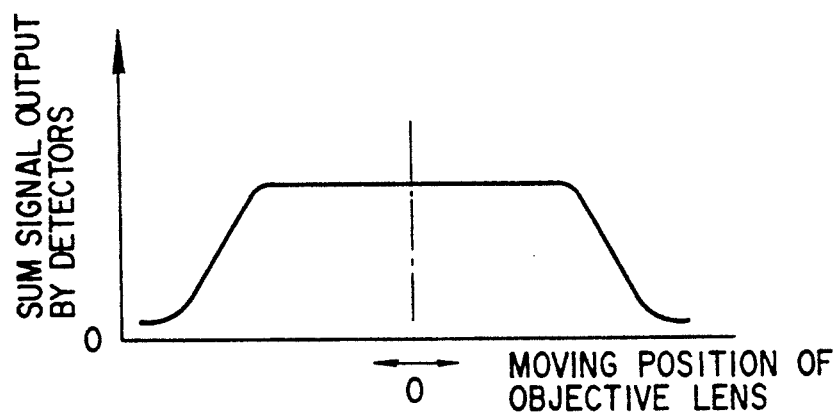
F I G. 5
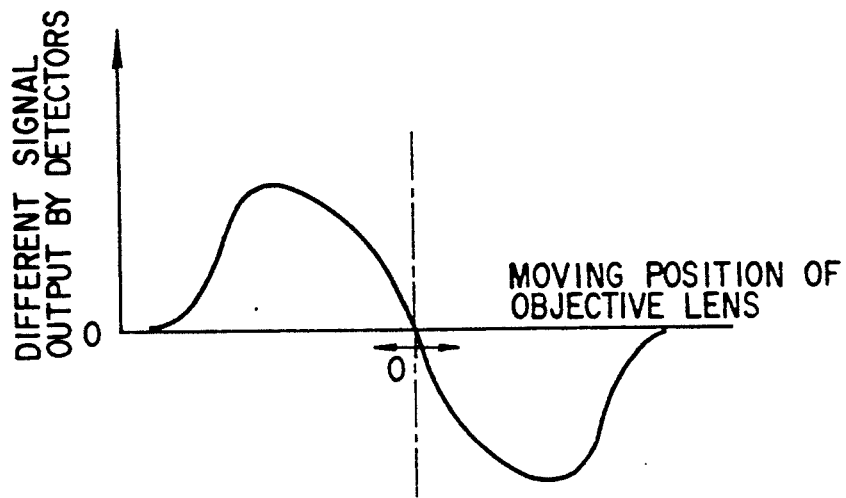
F I G. 6

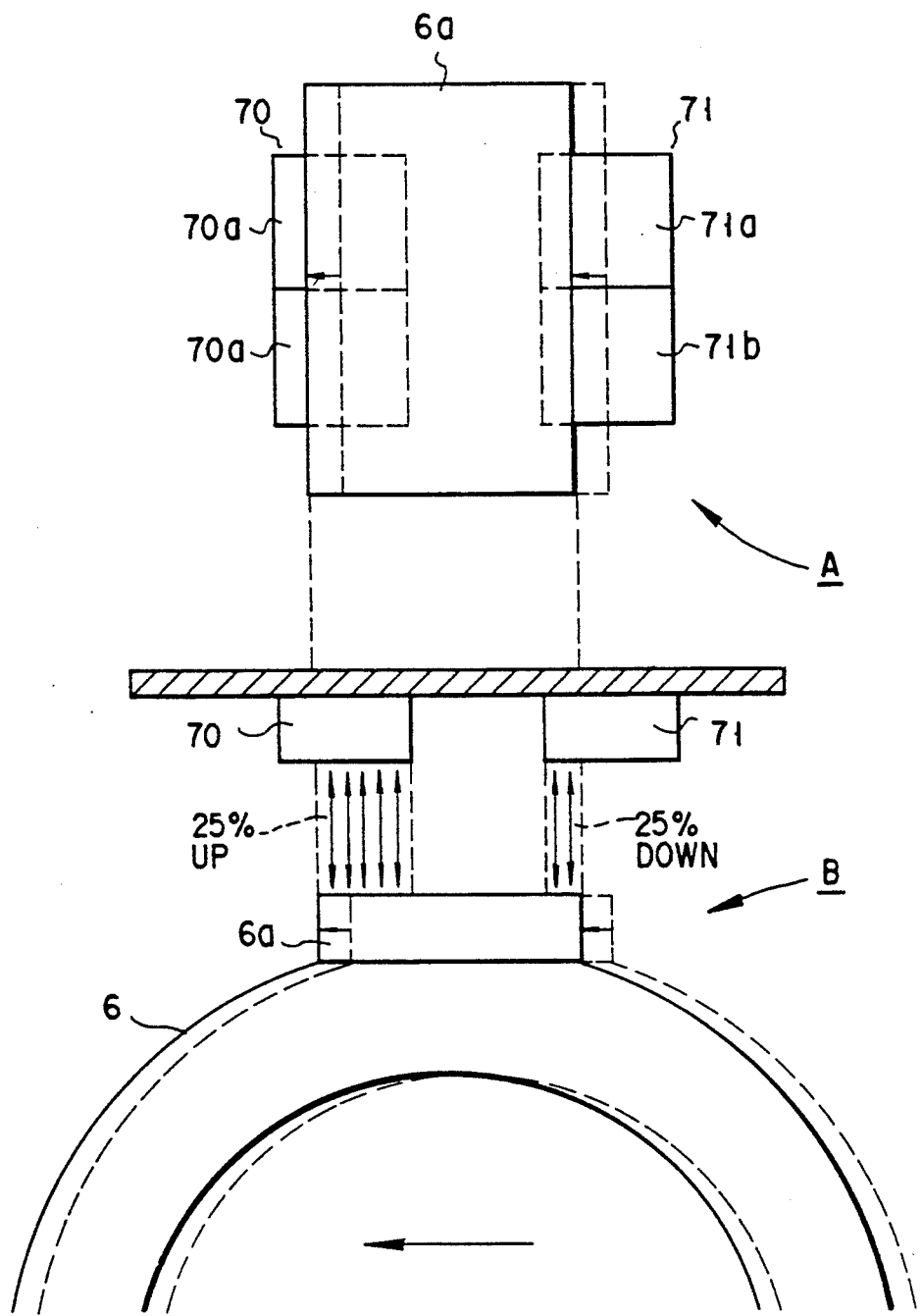
F I G. 7

5,306,903

OBJECTIVE LENS POSITION DETECTING SYSTEM CAPABLE OF ADJUSTING AMOUNTS OF RADIATION

BACKGROUND OF THE INVENTION

1. Field of the Invention

The present invention relates to an objective lens position detecting system which detects the position of an objective lens shifting in an optical head for use in, for example, a disk apparatus.

2. Description of the Related Art

Various disk apparatuses have been developed which cause a semiconductor laser oscillator (light source) in an optical head to irradiate a laser beam on an optical disk to record data on the optical disk, or convert data recorded on the optical disk into an electric signal by means of a detector provided in the optical head and then convert the signal into a video signal before reading it out.

Such optical disk apparatuses have a coarse access mode to roughly access an optical disk by moving the whole optical head and a fine access mode for finer access by moving an objective lens in the optical head.

When the whole optical head is moved in coarse access mode, the objective lens in the optical head vibrates. To prevent or suppress this vibration, the moving position of the objective lens is detected and the objective lens is held at a predetermined position based on a detection-reflecting signal in fine access mode.

A circuit for detecting the moving position of the objective lens outputs a detection signal corresponding to the amount of movement (moved distance) to a reflector that moves together with the objective lens, in accordance with the amount of light from the light source reflected or shielded by the reflector.

This detection circuit cannot however acquire an accurate detection signal when the amount of radiation from the light source (light-emitting element) varies due to dust or the ambient temperature.

SUMMARY OF THE INVENTION

It is therefore an object of the present invention to provide an objective lens position detecting system which detects the moving position of an objective lens by means of a light-emitting element and a light-receiving element and can ensure reliable detection of the position of the objective lens even when the amount of radiation from the light-emitting element varies due to dust, the ambient temperature, etc.

To achieve this object, according to the present invention, there is provided an objective lens position detecting system comprising holding means for holding an objective lens for focusing a light beam on a storage disk having tracks formed thereon; first means having a first light-emitting element and a first light-receiving element and provided in a vicinity of the objective lens, unconnected thereto, for detecting a position of the objective lens; second means having a second light-emitting element and a second light-receiving element and provided in a vicinity of the objective lens, unconnected thereto, and apart by a predetermined distance from the first detecting means, for detecting the position of the objective lens; means, connected to the objective lens, for reflecting light from the first light-emitting element to the first light-receiving element and reflecting light from the second light-emitting element to the second light-receiving element, whereby the first detecting means and the second detecting means detect the position of the objective lens from values of the reflected light; means for outputting a difference between detection signals received from the first detecting means and the second detecting means; and means for receiving the detection signals from the first detecting means and the second detecting means and adjusting amounts of radiation from the first light-emitting element and the second light-emitting element so as to cause a sum of the detection signals to approach a predetermined target value.

With the above arrangement of the present invention, even when the amounts of radiation from the light-emitting elements vary due to dust, etc. between the light-emitting elements and the light-receiving elements, the radiation amount adjusting means can automatically adjust the amounts of radiation according to the level of the signal representing the sum of the outputs of the individual light-emitting elements, thus always ensuring accurate measurement of the lens position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram illustrating the circuit structure of a detecting system according to this embodiment;

FIG. 3 is a plan view illustrating the structure of an essential portion in an optical head of the objective lens position detecting system according to the present invention;

FIG. 4 is a graph showing the relationship between the position of an objective lens of the objective lens position detecting system embodying the present invention and the detection outputs of individual detectors;

FIG. 5 is a graph showing the relationship between the position of the objective lens of the objective lens position detecting system embodying the present invention and a sum signal;

FIG. 6 is a graph showing the relationship between the position of the objective lens of the objective lens position detecting system embodying the present invention and a difference signal; and FIG. 7 is a conceptual diagram illustrating how the amount of light received by a receiving section changes in the detecting system of the present invention when the position of the objective lens is shifted.

DETAILED DESCRIPTION OF THE PREFERRED EMBODIMENTS

One preferred embodiment of the present invention will now be described referring to the accompanying drawings.

Figure 1A:
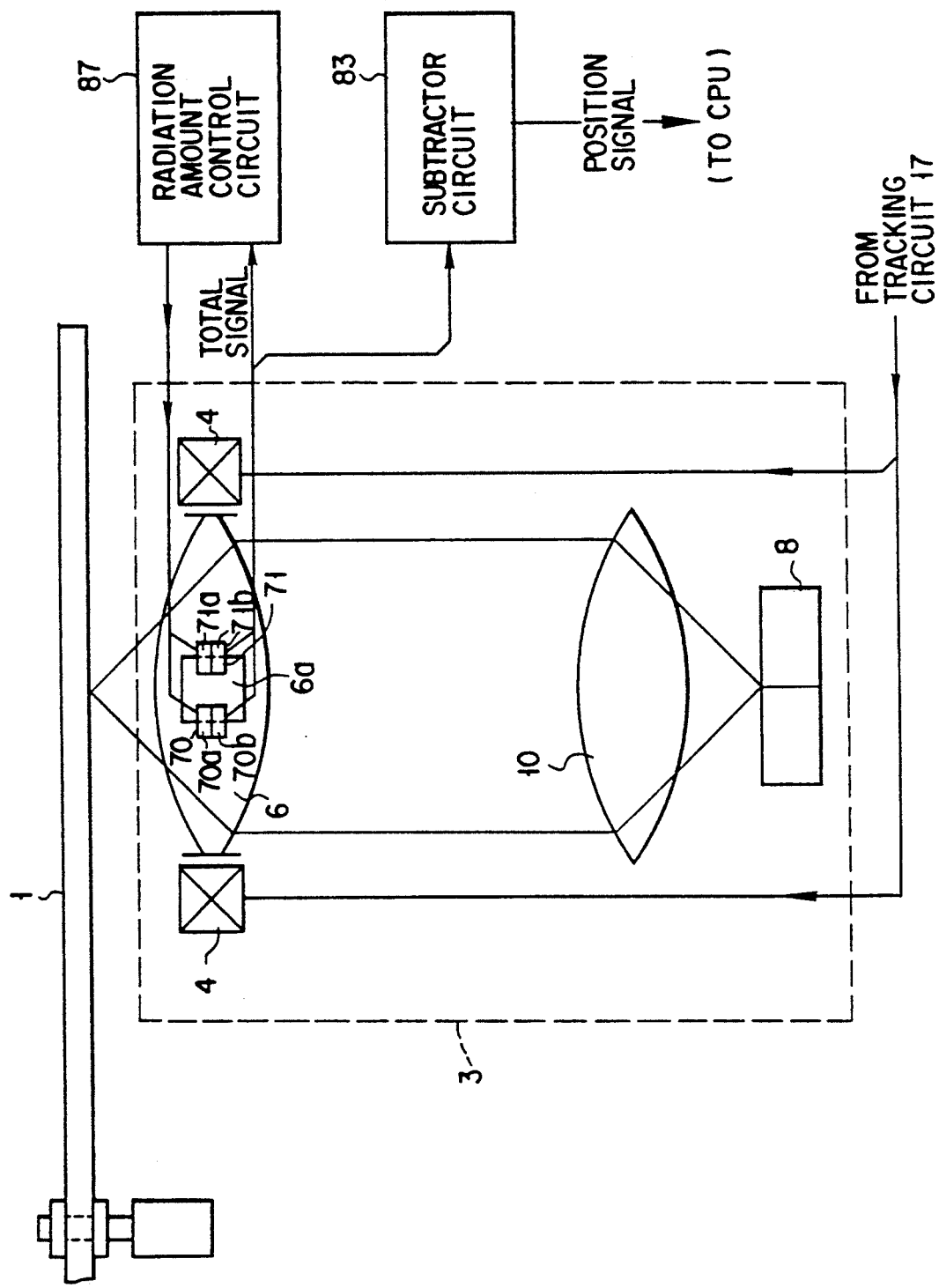
FIG. 1A is a conceptual diagram schematically showing an optical disk apparatus which uses an objective lens position detecting system embodying the present invention.

FIG. 1A is a conceptual diagram of a disk apparatus which uses an objective lens position detecting system embodying the present invention.

This disk apparatus records data on a disk 1, such as an optical disk or a magneto optical disk, or reproduces data therefrom using a focused light beam. In executing the operation, the focused light is detected by a focusing lens 10, an objective lens 6 and a photodetector 8 all housed in an optical head 3. At this time, the objective lens 6 is finely driven in the optical head 3 by a drive coil 4 which is excited or deexcited under the control of a tracking circuit 17. A reflector 6a is connected to the objective lens 6. A first position detector 70 is provided, unconnected to the objective lens 6, at a fixed portion of the optical head 3. This position detector 70 has a first light-emitting element 70a for irradiating light on the reflector 6a and a first light-receiving element 70b for receiving light reflected from the reflector 6a. A second position detector 71 is provided, also unconnected to the objective lens 6, at the fixed portion of the optical head 3, apart by a given distance from the first position detector 70. This position detector 71 likewise has a second light-emitting element 71a for irradiating light on the reflector 6a and a second light-receiving element 71b for receiving light reflected from the reflector 6a. The first light-emitting and light-receiving elements 71a, 71b are arranged in a direction perpendicular to a direction in which the objective lens 6 is moved.

With the above structure, this objective lens position detecting system detects a fine positional change of the objective lens 6 from the center position in the optical head 3 by means of the two position detectors 70 and 71, acquires the difference between output signals of those two position detectors in a subtractor circuit 83 and finds the accurate position of the objective lens from the difference.

The output signals of the two position detectors 70 and 71 are also supplied to a radiation amount control circuit 87, which in turn acquires a sum signal representing the sum of the received signals. To make the sum signal have a constant value, the circuit 87 provides the first and second light-emitting elements 70a and 71a with signals to specify the amounts of light or radiation from those light-emitting elements. In other words, the radiation amount control circuit 87 feeds back the signals from the first and second light-emitting elements 70a and 71a to control the amounts of radiation therefrom to constant levels. Even if the amount of radiation from either light-emitting element varies due to dust or the ambient temperature, therefore, this disk apparatus can acquire a detection signal representing the accurate current position of the objective lens.

FIG. 2 illustrates a disk apparatus, which irradiates convergent light on a disk 1, such as an optical disk or a magneto optical disk, to conduct data recording, reproduction or erasing.

The disk 1, which has spiral grooves (recording formed on its surface, is driven at a constant angular velocity by a motor 2 under the control of a motor control circuit 18.

The surface of the disk 1 is divided into multiple sectors with a reference sector mark as a reference. Information of various lengths can be recorded over multiple blocks on the disk 1; for example, 300,000 blocks are to be formed on 36,000 tracks on the disk 1. The sectors and tracks serve to specify the addresses of blocks.

The recording capacity per block on the disk 1 is constant, and the number of sectors constituting one block decreases as the block position moves from the inner periphery of the disk toward the outer periphery. At the start position of the block is provided a block header (header portion) including the block number, track number and sector position. This header portion is recorded at the time the disk 1 is produced. Following the header portion is a data portion where data is to be recorded.

When each block on the disk 1 does not end at the sector-to-sector transitional point, a block gap is provided so that each block should start from one sector-to-sector transitional point and end at the next proper sector-to-sector transitional point.

Information recording, reproduction or erasure to the disk 1 is carried out by an optical head 3. This optical head 3 is secured to a drive coil 13 which constitutes the movable section of a linear motor 31, the drive coil 13 connected to a linear motor control circuit 17.

Connected to this linear motor control circuit 17 is a linear motor position detector 26, which detects an optical scale 25 provided on the optical head 3 to output a position signal representing the position of the head 3.

The fixed section of the linear motor 31 is provided with a permanent magnet (not shown), so that as the drive coil 13 is excited by the linear motor control circuit 17, the optical head 3 moves in the radial direction of the disk 1.

The disk 1 uses a recording film of a type which forms pits by ablation, but may by of a type which utilizes a phase change or a multilayered recording film.

Recording/reproducing magnetic field generating means 35 constituted of an electromagnet or permanent magnet is disposed at a portion to face the optical head 3 with the disk 1 in between. This magnetic field generating means 35 is so designed as to be able to invert the polarity of the generated field in accordance with a signal associated with writing of pits to be recorded or erasing of recorded pits. This magnetic field generating means 35 may be provided on the optical head side.

As shown in FIG. 2, the optical head 3 comprises an objective lens 6, drive coils 4 and 5 for driving the objective lens 6, a photodetector 7 serving as a focusing position sensor, a photodetector 8 serving as a tracking position sensor, a laser diode as a semiconductor laser oscillator, a focusing lens 10, a collimator lens 11a which collimates a laser beam from the laser diode 9, half prisms 11b and 11c, a focusing lens 11d, a knife edge 12, and a monitoring photodiode PD as a radiation amount detecting device which detects the amount of radiation of the laser diode 9.

As shown in FIGS. 2 and 3, the objective lens 6 is suspended from the fixed portion (not shown) by means of wire suspensions 51. This objective lens 6 is movable in the focusing direction or in the direction of the optical axis of the objective lens 6 by the drive coil 5, and movable in the tracking direction or in the direction perpendicular to the optical axis of the objective lens 6 by the drive coil 4.

The interaction of drive coil 4, and permanent magnets 52 arranged on the fixed portion causes the objective lens 6 to move in the direction of the illustrated arrow C or in the direction perpendicular to the optical axis of the objective lens 6.

Figure 1B:
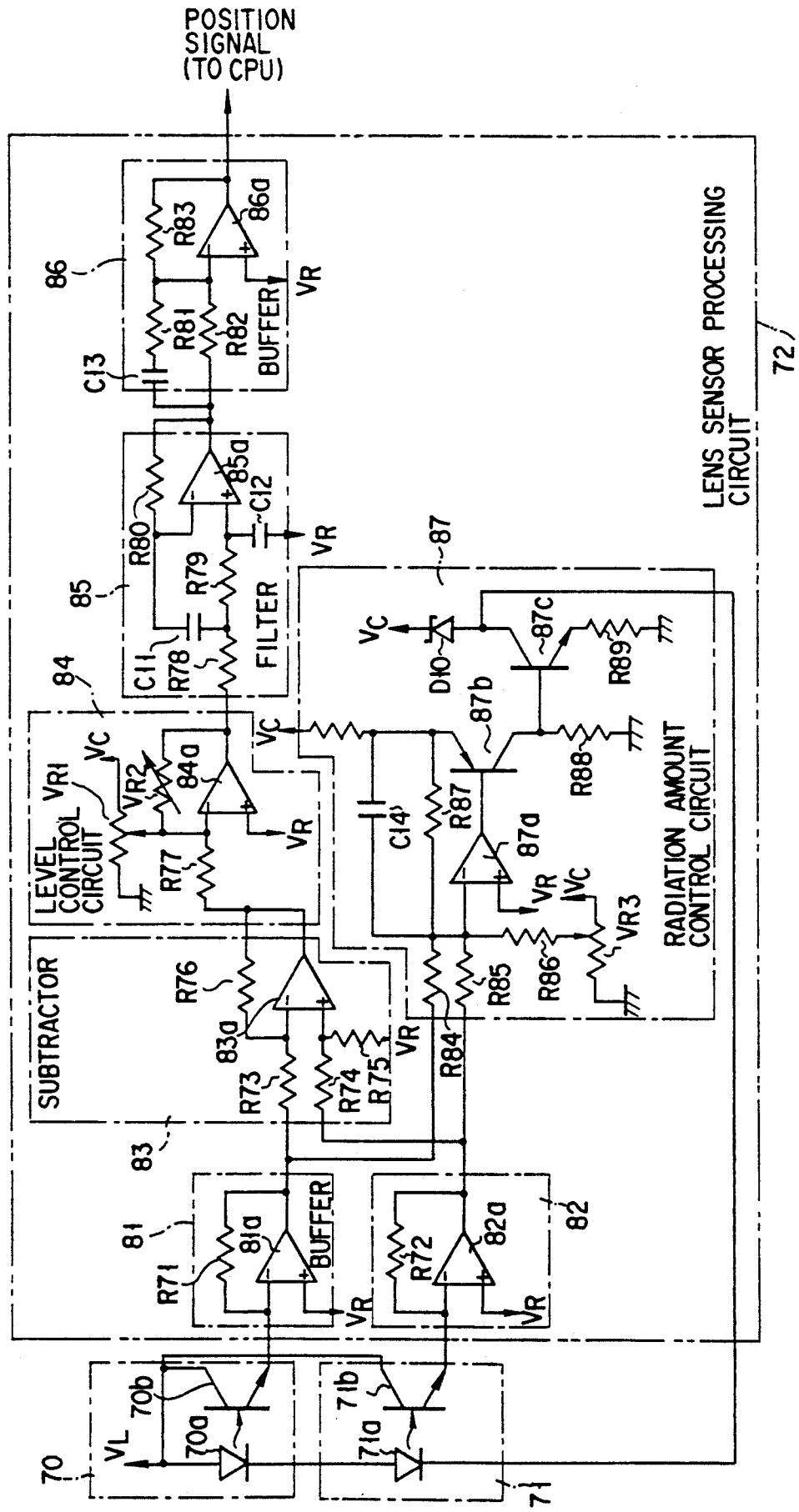
FIG. 1B is a diagram showing the circuit structure of a lens sensor processing circuit according to one embodiment of the present invention.

A reflector 6a, constituted of a mirror or the like which moves together with the objective lens 6 in the direction of the arrow C, is provided on the side of the objective lens 6. Two detectors 70 and 71 secured to the body of the optical head 3 are provided side by side in the direction of the illustrated arrow C on the position opposite to the reflector 6a. Those detectors 70 and 71 respectively comprise LEDs (Light-Emitting Diodes) 70a and 71a as light-emitting elements, and phototransistors 70b and 71b as light-receiving elements, as shown in FIG. 1B.

Electric signals from those detectors 70 and 71, which correspond to the position of the reflector 6a, are output to a lens sensor processing circuit 72 serving as a position detecting circuit. With the objective lens 6 located at the center position, the difference signal of the detection signals from the detectors 70 and 71 becomes "0." Accordingly, the difference signal of the detection signals from the detectors 70 and 71 is output as an electric signal of a level corresponding to the moving position of the objective lens 6.

FIG. 4 illustrates the detecting characteristics of the detectors 70 and 71, showing detection outputs a and b of the detectors 70 and 71 with respect to the position of the objective lens 6. The circuit constant of the lens sensor processing circuit 72 is determined so that, when the objective lens 6 is located at a neutral position in the vicinity of the center position in the movable range of that lens, the detection outputs of the detectors 70 and 71 are of the same level, yielding the difference signal of "0" as shown in FIG. 6. The characteristics of the detectors 70 and 71 are determined so that the sum of the detection outputs a and b is constant.

The lens sensor processing circuit 72 acquires the difference signal (see FIG. 6) of the detection signals from the detectors 70 and 71, and outputs this difference signal as an electric signal of a level corresponding to the moving position of the objective lens 6, i.e., a position signal.

The lens sensor processing circuit 72 also acquires a sum signal of the detection signals from the detectors 70 and 71, and controls the amounts of radiation of the LEDs 70a and 71a in the detectors 70 and 71 based on the sum signal.

As shown in FIG. 1B, this lens sensor processing circuit 72 comprises buffers 81 and 82, a subtractor circuit 83, a level control circuit 84, a filter 85, another buffer 86, and a radiation amount control circuit 87.

The buffers 81 and 82 convert currents as the detection signals from the respective detectors 70 and 71 into voltages. The buffer 81 comprises an amplifier 81a and a resistor R71, and the buffer 82 an amplifier 82a and a resistor R72, as shown in FIG. 1B.

The subtractor circuit 83 subtracts the detection signal of the detector 71, supplied from the buffer 82, from the detection signal of the detector 70, supplied from the buffer 81, as shown in FIG. 6. This subtractor circuit 83 comprises a differential amplifier 83a and resistors R73 to R76, as shown in FIG. 1B.

The level control circuit 84 controls the signal level of the difference signal representing the subtraction result from the subtractor circuit 83. This level control circuit 84 comprises an amplifier 84a, a resistor R77, and variable resistors VR1 and VR2, as shown in FIG. 1B.

The level control circuit 84 is designed to be able to control the bias voltage corresponding to the difference signal of the aforementioned detection signals by means of the variable resistor VR1, and to alter the amplification factor of the amplifier 84a by means of the variable resistor VR2.

The filter 85 is a low-pass filter which passes only that component of the difference signal from the level control circuit 84 which has a given frequency band, i.e., it performs band control. As shown in FIG. 1B, the filter 85 comprises an amplifier 85a, resistors R78 to R80, and capacitors C11 and C12. The band control of the filter 85 can eliminate nose generated from the phototransistors 70b and 71b.

The buffer 86 serving to temporarily hold the difference signal supplied from the filter 85, comprises an amplifier 86a, resistors R81 to R83 and a capacitor C13, as shown in FIG. 1B.

FIG. 7 is a conceptual diagram illustrating how the amount of light received by a receiving section changes in the detecting system of the present invention when the position of the objective lens is shifted. A part A shows a top plan view and another part B shows a view from the front of the lens. As reference numerals in this diagram are the same as those given in FIG. 2, the description of the components having those numerals will not be given below. Now, the objective lens 6 is shifted to the left from the center position by the drive coil 4 (not shown), external force or the like. As the reflector 6a is shifted by a predetermined distance, the light from the first light-emitting element 70a of the first position detector 70 is irradiated on the reflector 6a, 25% more than the case where the objective lens 6 is at the center position, and is reflected to enter the first light-receiving element 70b. Meanwhile, the light is reflected 25% less to enter the second light-receiving element 71b of the second position detector 71. It is therefore possible to find out the current position of the objective lens 6 by comparing the received signals of the first light-receiving element 70b and the second light-receiving element 71b and subtracting one signal from the other in the aforementioned subtractor circuit 83.

The radiation amount control circuit 87 acquires the sum signal of the detection signals from the detectors 70 and 71, supplied from the buffers 81 and 82, as shown in FIG. 5. Based on this sum signal, this control circuit 87 controls the amounts of currents for the LEDs 70a and 71a in the detectors 70 and 71 by means of a transistor 87C, thereby adjusting the amounts of radiation of the LEDs 70a and 71a. Even if the amounts of radiation of the LEDs 70a and 71a vary due to dust or the ambient temperature, the radiation amounts can be controlled accurately and automatically. As a result, the detection outputs of the detectors 70 and 71 can be kept constant.

As shown in FIG. 1B, the radiation amount control circuit 87 comprises an amplifier 87a, transistors 87b and 87c, resistors R84 to R89, a variable resistor VR3, a constant-voltage diode D10 and a capacitor C14.

The radiation amount control circuit 87 can also control the bias voltage corresponding to the sum signal of the two detection signals by means of the variable resistor VR3.

Even if the amounts of radiation of the LEDs 70a and 71a vary greatly, the amounts can be adjusted by the variable resistors VR1 and VR3 as volumes by altering the amplification factor of the level control circuit 84 and the sum signal of the detection signals of the radiation amount control circuit 87.

Also, an offset corresponding to a possible mounting variation of the optical head 3 can be adjusted by the variable resistor VR1 as a volume by altering the bias corresponding to the difference signal of the detection signals of the level control circuit 84.

The operation of the objective lens position detecting system with the above structure will be discussed below.

Currents as detection signals flowing in the phototransistors 70b and 71b of the detectors 70 and 71 are converted into voltages by the respective buffers 81 and 82, and the voltages are then output to the subtractor circuit 83 and the radiation amount control circuit 87. The subtractor circuit 83 subtracts the voltage value from the buffer 82 from the voltage value from the buffer 81 to acquire a difference signal of the detection signals (voltage values) of the detectors 70 and 71, and outputs this signal to the level control circuit 84. The level control circuit 84 controls the level of the received difference signal to the level matching the amounts of radiation of the LEDs 70a and 71a, and outputs the resultant signal to the filter 85. The filter 85 performs band control on the received difference signal to remove noise generated in the phototransistors 70b and 71b and outputs the resultant noise-eliminated signal as a position signal to a CPU 23 via the buffer 86.

The radiation amount control circuit 87 controls the amounts of currents for the LEDs 70a and 71a based on a sum signal obtained by adding the voltage value from the buffer 81 to that from the buffer 82.

A laser beam generated by the laser diode 9 is irradiated on the disk 1 via the collimator lens 11a, the half prism 11b and the objective lens 6. The light reflected from the disk 1 passes through the objective lens 6 and the half prism 11b to enter the half prism 11c to be split into two components. One of the split light components is guided via the focusing lens 10 to the photodetector 8 serving as a pair of tracking position detectors. The photodetector 8 comprises two photodiodes 8a and 8b.

The other light component split by the half prism 11c is led via the knife edge 12 to the photodetector 7. The photodetector 7 comprises two photodiodes 7a and 7b.

A detection signal from this photodiode PD is supplied to the laser control circuit 14.

The photodiodes 8a and 8b of the photodetector 8 are connected to a pre-amplifier 36, and the photodiodes 7a and 7b of the photodetector 7 to a pre-amplifier 37.

The pre-amplifier 36 outputs a voltage signal corresponding to a data signal as header data or record data to the disk 1 of a write once read many (WORM) type in response to the detection currents from the photodiodes 8a and 8b, and a tracking signal (track error signal) concerning the tracking point of the laser beam.

The pre-amplifier 37 outputs a voltage signal corresponding to a data signal as header data or record data to the disk 1 of a rewritable type (magneto optical disk) in response to the detection currents from the photodiodes 7a and 7b, and a focusing signal (focus error signal) concerning the focusing point of the laser beam.

The tracking signal from the pre-amplifier 36 is supplied to a tracking control circuit 16. The track error signal from the tracking control circuit 16 is supplied to the tracking drive coil 4 as well as the linear motor control circuit 17.

The focusing signal from the pre-amplifier 37 is supplied to a focusing control circuit 15. The focusing control circuit 15 sends its output signal to the focusing drive coil 5 so that the laser beam is always on focus on the target area on the disk 1.

The data signal (voltage value) from the preamplifier 36 reflects the corrugation of the pits (header data or recorded data) recorded on the disk (WORM type) 1. This data signal is supplied to a video signal processing circuit 19 which in turn reproduces address data (track number, sector number, etc.) as header data, and image data.

The data signal (voltage value) from the preamplifier 37 reflects the corrugation of the pits (recorded data) recorded on the disk (rewritable type magneto optical disk) 1. This data signal is supplied to the video signal processing circuit 19 which in turn demodulates the signal to reproduce image data.

A memory signal forming circuit 34 is provided in the preceding stage of the laser control circuit 14. The memory signal forming circuit 34 serves as a modulator which modulates recorded data, supplied from a photomagnetic disk controller 33 as an external device via an interface circuit 32, to a recording pulse.

In response to a select signal from the CPU 23, the laser control circuit 14 causes the laser diode 9 to generate a laser beam having an intensity corresponding to the amount of reproducing light. With the laser beam of the intensity of reproducing light, the laser control circuit 14 drives the laser diode 9 to generate a laser beam of the intensity of recording light, in response to a recording pulse (original signal) supplied from the memory signal forming circuit 34. The laser control circuit 14 controls the amount of output light (reproducing light) from the laser diode 9 by means of the monitor current from the photodiode PD.

A video signal (demodulation signal) from the video signal processor 19 is sent to the photo-magnetic disk controller 33 after the error correction or the like is executed in the interface circuit 32.

The disk apparatus further comprises a D/A converter 22 for exchange of information between the CPU 23 and the focusing control circuit 15, the tracking control circuit 16 and the linear motor control circuit 17.

The tracking control circuit 16 shifts the objective lens 6 in accordance with a track jump signal sent from the CPU 23 via the D/A converter 22, and also shifts the laser beam by one track.

The laser control circuit 14, the focusing control circuit 15, the tracking control circuit 16, the linear motor control circuit 17, and the motor control circuit 18, the video signal processing circuit 19, the memory signal forming circuit 34, etc. are controlled by the CPU 23 though a bus line 20. The CPU 23 is to execute a predetermined operation by a program stored in a memory 24.

The CPU 23 discriminates the moving position of the objective lens 6 in the direction C in the optical head 3 from the position signal from the lens sensor processing circuit 72.

A description will now be given of the discrimination of the moving position of the objective lens 6 in the above-described structure in the case where the optical head 3 is moved by the linear motor 31 in coarse access mode.

When the objective lens 6 is shifted from the center position, the detection signal of the phototransistor 70b differs from that of the phototransistor 71b and a position signal corresponding to the difference is output to the CPU 23 from the lens sensor processing circuit 72.

The CPU 23 judges the moving position of the objective lens 6 from the received position signal, and controls the tracking circuit 16 in accordance with the discrimination result to drive the drive coil 4 to thereby return the objective lens 6 to the center position.

As described above, the use of two detectors can broaden the positional offset margin, and feedback of the amount of radiation of each LED by a sum signal of the detection outputs of the two detectors can suppress an output change due to a variation in the light source.

Further, the detection outputs of the detectors can be kept constant even with a positional change due to dust, the ambient temperature or the like by using two detectors and controlling the currents of the LEDs using a sum signal of the detection outputs of both detectors.

Furthermore, it is possible to control the gains of the output signals of the photodiodes and the offset with respect to a variation in LEDs and a mounting variation (error) of the optical head, and control the reference voltage for feedback to the LEDs, which is prepared by the sum signal of the output signals of the photodiodes with respect to a change in the amounts of radiation of the LEDs.

As described in detail above, the present invention can provide an objective lens position detecting system which can acquire an accurate detection signal representing the accurate current position of the objective lens even if the amount of radiation from either light-emitting element varies due to dust or the ambient temperature.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical disk apparatus having an objective lens position detecting system, comprising:
   means for rotating a storage disk;
   means for reading out data from the storage disk, the reading means comprising,
   means for holding an objective lens for focusing a light beam on a storage disk having tracks formed thereon,
   first detecting means having a first light-emitting element and a first light-receiving element and provided in a vicinity of the objective lens, unconnected thereto, for detecting a position of the objective lens, the first light-emitting element and the first light-receiving element being arranged perpendicular with respect to a lens moving direction where the objective lens is moved,
   second means, having a second light-emitting element and a second light-receiving element and provided in a vicinity of the objective lens, unconnected thereto, and apart by a predetermined distance from the first detecting means, for detecting the position of the objective lens, the second light-emitting element and the second light-receiving element being arranged perpendicular with respect to the lens moving direction,
   means, connected to the objective lens, for reflecting light from the first light-emitting element to the first light-receiving element and reflecting light from the second light-emitting element to the second light-receiving element, whereby the first detecting means and the second detecting means detect the position of the objective lens from values of the reflected light,
   means for outputting a difference between detection signals received from the first detecting means and the second detecting means, and
   means for receiving the detection signals from the first detecting means and the second detecting means and adjusting amount of radiation from the first light-emitting element and the second light-emitting element so as to cause a sum of the detection signals to approach a predetermined target value.

2. An objective lens position detecting system, comprising:
   means for holding an objective lens for focusing a light beam on a storage disk having tracks formed thereon;
   first means, having a first light-emitting element and a first light-receiving element and provided in a vicinity of the objective lens, unconnected thereto, for detecting a position of the objective lens, the first light-emitting element and the first light-receiving element being arranged perpendicular with respect to a lens moving direction where the objective lens is moved;
   second means, having a second light-emitting element and a second light-receiving element and provided in a vicinity of the objective lens, unconnected thereto, and spaced a predetermined distance from the first detecting means, for detecting the position of the objective lens, the second light-emitting element and the second light-receiving element being arranged perpendicular with respect to the lens moving direction;
   means, connected to the objective lens, for reflecting light from the first light-emitting element to the first light-receiving element and reflecting light from the second light-emitting element to the second light-receiving element, whereby the first detecting means and the second detecting means detect the position of the objective lens from values of the reflected light;
   means for outputting a difference between detection signals received from the first detecting means and the second detecting means; and
   means for receiving the detection signals from the first detecting means and the second detecting means and adjusting amounts of radiation from the first light-emitting element and the second light-emitting element so as to cause a sum of the detection signals to approach a predetermined target value.

3. The objective lens position correcting system of claim 2, further comprising means, provided in the holding means, for correcting the position of the objective lens in accordance with the sum of and difference between the detection signals.

4. An objective lens position detecting system according to claim 2, wherein the adjusting means controls amounts of radiation of the first light-emitting element and the second light-emitting element so as to make a sum of signals from the first light-receiving element and the second light-receiving element constant.

5. An objective lens position detecting system according to claim 4, further comprising means, connected to the adjusting means, for setting the acquired sum of the adjusting means to the predetermined target value.

6. An objective lens position detecting system according to claim 2, further comprising:

means, provided in the holding means, for converting focused light from the objective lens into a signal;
means for discriminating where on the storage disk the objective lens is tracking based on the signal from the converting means; and
second means for moving the holding means in accordance with judgment of the discriminating means.

7. An objective lens position detecting system according to claim 6, wherein the second moving means is a linear motor.

* * * * *